United States Patent [19]

Rudich, Jr. et al.

[11] Patent Number: 4,554,496
[45] Date of Patent: Nov. 19, 1985

[54] CONTROLLABLE ROTARY ACTUATOR

[75] Inventors: George Rudich, Jr.; Charles F. Beeson, both of Goshen; Gary L. Bartley, Elkhart; Terry A. Heckenbach, Middlebury, all of Ind.

[73] Assignee: Johnson Service Company, Milwaukee, Wis.

[21] Appl. No.: 469,928

[22] Filed: Feb. 25, 1983

[51] Int. Cl.[4] ............................................. G05B 19/26
[52] U.S. Cl. ..................................... 318/600; 318/12; 318/15; 318/663; 74/460; 361/415
[58] Field of Search ................... 318/663, 15, 12, 349, 318/601, 600; 74/DIG. 10, 460; 361/415

[56] References Cited

U.S. PATENT DOCUMENTS

| | | | |
|---|---|---|---|
| 2,392,320 | 1/1946 | Hegy | 318/15 |
| 2,760,381 | 8/1956 | Pickles | 74/460 X |
| 3,172,026 | 3/1965 | Schuman | 318/601 |
| 3,316,469 | 4/1967 | Dicke | 318/12 X |
| 3,536,974 | 10/1970 | Beigl et al. | 318/349 X |
| 4,265,394 | 5/1981 | Nagel | 318/160 X |
| 4,374,351 | 2/1983 | Fishman et al. | 318/600 |
| 4,393,343 | 7/1983 | Angersbach et al. | 361/415 X |

Primary Examiner—B. Dobeck
Attorney, Agent, or Firm—Larry L. Shupe; Joseph J. Jochman, Jr.; John Phillip Ryan

[57] ABSTRACT

A motor-driven rotary actuator includes an electric drive motor adapted to be configured for providing one of a plurality of output torques. A power transmission is coupled to the drive motor and includes a rotatable output shaft and drive elements adapted to be formed of disparate materials selected for transmitting one of the output torques. An electric controller is coupled to the motor for providing rotation positioning control of the output shaft in response to digital command signals.

6 Claims, 24 Drawing Figures

| DRIVE ELEMENT NUMBER | 35 lb-in OUTPUT TORQUE | 75 lb-in OUTPUT TORQUE | 150 lb-in OUTPUT TORQUE |
|---|---|---|---|
| PINION 63 | CS | CS | CS |
| PINION 95 | CS | CS | CS |
| PINION 137 | PL | PM | PM |
| PINION 139 | PM | PM | PM |
| PINION 141 | PM | PM | CS |
| BULL 89 | PL | PL | PL |
| BULL 142 | PL | PM | PM |
| BULL 143 | PL | PM | PM |
| BULL 145 | PM | PM | PM |
| BULL 93 | PM | PM | CS |

CS - CUT STEEL
PL - PLASTIC
PM - POWDERED METAL

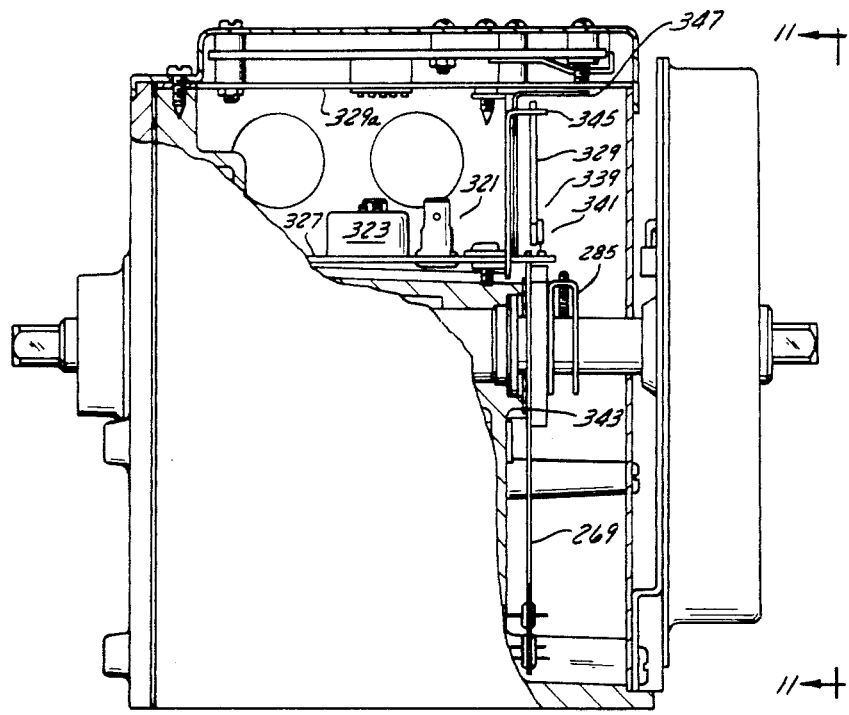
FIG. 10
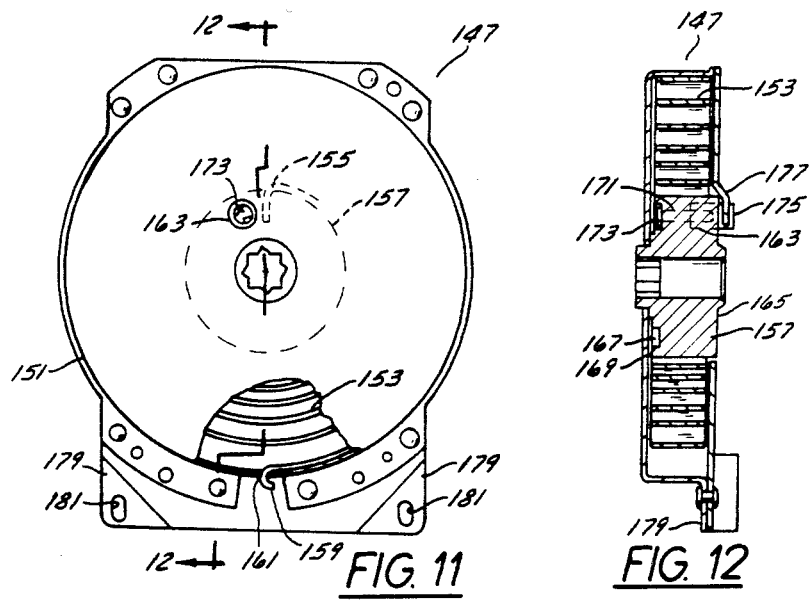
FIG. 11
FIG. 12

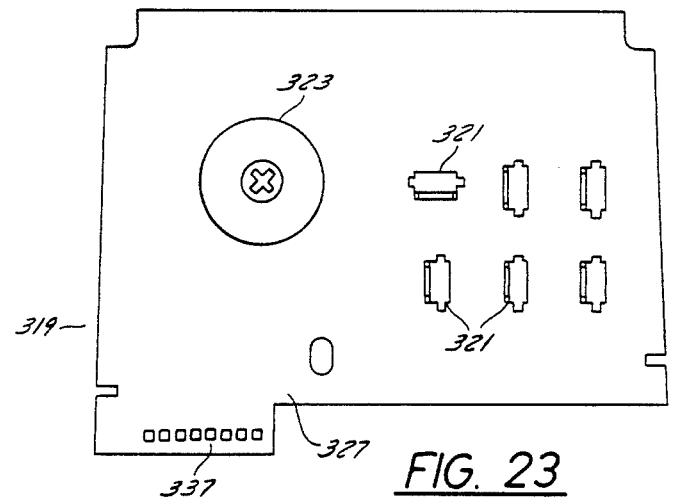
FIG. 23
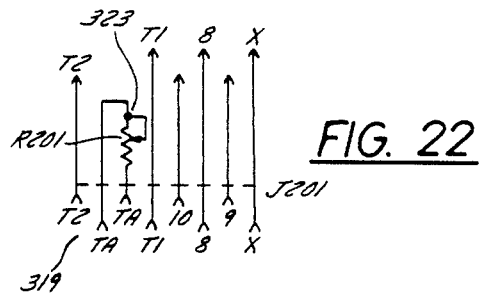
FIG. 22
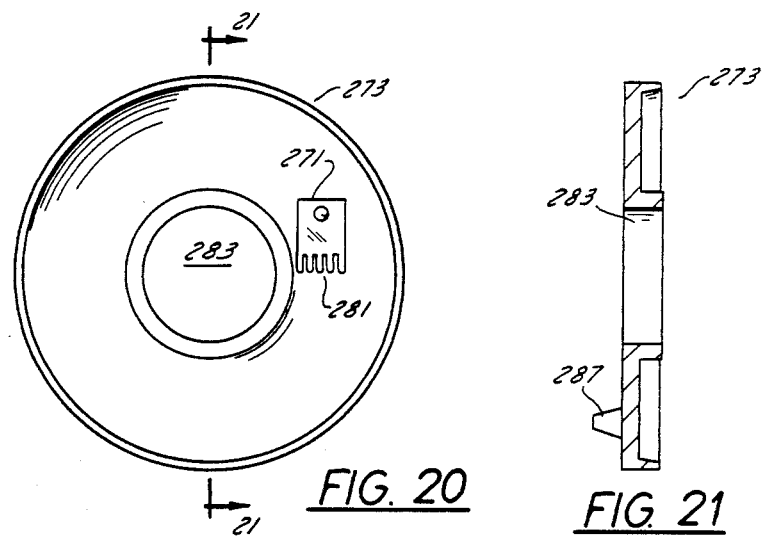
FIG. 20
FIG. 21

CONTROLLABLE ROTARY ACTUATOR

BACKGROUND OF THE INVENTION

This invention relates generally to actuators for positioning control of devices coupled thereto and more particularly to electrically controlled actuators for positioning of valves, mechanical dampers and the like as employed in process control systems. The invention is particularly suited for use in systems related to heating, ventilating and air conditioning applications.

Process control systems frequently employ valves which may be positionably adjusted for controlling the flow of fluids within a conductor system such as a pipeline. Other types of fluid flow controlling devices often encountered in process control systems include dampers which may be actuated for controllably modulating the flow of gases therethrough. One type of process control system in which the rotary actuator of the present invention may be advantageously used includes heating, ventilating and air conditioning (HVAC) systems which usually employ a plurality of air handling units comprising interconnected ductwork having mechanical dampers associated therewith. The ductwork and dampers cooperate for controlling the flow of outside ambient air into a conditioned space, for controlling the flow of air from the space to the ambient and for controlling air flow between cool and warm air ducts. HVAC systems also employ actuator-positioned valves whereby the flow of chilled or heated water through heat exchanger coils may be controlled in accordance with the air temperature which is desired to be maintained as the air passes over such coils for air temperature-regulating purposes. Liquid flow control valves and fluid controlling dampers of the aforementioned type are available in a wide variety of sizes and torque requirements, such sizes being generally related to the size of the air handling unit with which they may be associated. While it is known to utilize electrically-driven rotary actuators for positioning such valves and dampers, the wide range of torque requirements of such devices has heretofore necessitated that such actuators be configured in a variety of drive motor torque output ranges, enclosure sizes and gearing arrangements. Further, the relatively recent advent of sophisticated control equipment including computerized direct digital control systems utilizing algorithms for effecting sophisticated control strategies has required that such rotary actuators have the capability of being readily adapted to respond to and be controlled by low voltage digital signals. The result of these widely disparate application requirements has been a proliferation of electrically-controlled rotary actuators which impose unnecessary complexities upon the manufacturing, warehousing and field installation functions.

An electrically-controlled rotary actuator which takes maximum advantage of parts commonality and is adapted to be configured for providing any one of several rated output torques, which includes a power transmission having drive elements capable of being formed of several disparate materials selected in view of such torque requirements and which is adapted to respond to and be controlled by low voltage digital signals would be a significant advance over the prior art.

SUMMARY OF THE INVENTION

In general, the motor-driven rotary actuator of the present invention includes an electric drive motor adapted to be configured for providing one of a plurality of output torques. A power transmission including a rotatable output shaft is coupled to the drive motor and includes drive elements adapted to be formed of disparate materials selected for transmitting a particular output torque. An electric controller is coupled to the drive motor for providing rotation positioning control of the actuator output shaft in response to digital command signals. The controller is preferably embodied to include a plurality of circuit boards adapted to be electrically coupled one to the other by multiple conductor plug-in connectors.

A preferred drive motor is of the single phase, permanent split capacitor type which may be adapted by suitable stator winding configuration and phase-shifting capacitor selection to provide any one of several rated output torques. A multiple-gear power transmission including an output shaft is coupled to the drive motor and includes a plurality of gear elements which may be formed of cut steel, powdered metal and/or a plastic material with the material of specific gear elements being selected in view of the desired actuator output torque. The gear elements and their related support shafts utilize the same shaft centerlines and mounting structure irrespective of the materials from which the elements may be formed.

The electric controller includes a first control circuit having means for generating a signal representative of the actual angular position of the output shaft and static switching means for controllably de-energizing the drive motor. A second, addressable control circuit is electrically coupled to the first control circuit for providing rotation positioning control of the output shaft in response to digital command signals transmitted by a remotely located system controller (not shown) along a bus connected between the actuator and the controller. The second control circuit includes power supply means, switch means for address selection and a resettable bus interface for attenuating spurious electrical noise. A feedback section is provided for generating an error signal while an analog-to-digital converter section is coupled to the feedback section for generating digital signals representative of the actual position of the actuator. A microcomputer section is provided for data processing while a motor energizing section is coupled to a microcomputer section for selectively triggering the static switching means of the first control circuit to provide clockwise, counterclockwise or no rotation of the actuator output shaft. A separately mounted terminating means may be provided for simplified attachment of field wiring brought into the actuator enclosure.

Spring return and retarder brake assemblies may optionally be incorporated as dictated by the requirements of the specific application. The spring return assembly may be coupled to the exterior of a common housing adapted to accommodate the drive motor, power transmission and the electric controller.

It is an object of the present invention to provide a motor-driven rotary actuator which overcomes the aforementioned disadvantages of the prior art.

Another object of the present invention is to provide a rotary actuator which includes a drive motor adapted to be configured for providing one of a plurality of output torques.

Yet another object of the present invention is to provide a rotary actuator having a power transmission which includes drive elements adapted to be formed of disparate materials selected for the transmission of one of several output torques.

Still another object of the present invention is to provide a rotary actuator which includes an electric controller for providing rotation positioning control of the actuator output shaft in response to digital signals.

Another object of the present invention is to provide a rotary actuator wherein a variety of electronic control panels may be received within a common actuator housing.

Yet another object of the present invention is to provide a motor-driven actuator which may be readily adapted to a variety of process control strategies.

Still another object of the present invention is to provide a rotary actuator which may be adapted to one of a variety of control configurations by using plug-in circuit boards.

Another object of the present invention is to provide a rotary actuator which may be readily adapted to incorporate spring return and retarder brake features. These and other objects of the present invention will become more apparent from the detailed description thereof taken with the accompanying drawing.

BRIEF DESCRIPTION OF THE DRAWING

FIG. 10 is a side elevation view generally of the actuator of FIG. 1 taken along the plane 2—2 thereof and further generally depicting the optional spring return mechanism and the location of additional circuit boards used in certain embodiments, with portions shown in cross section and other portions broken away;

FIG. 11 is a view of the spring return mechanism taken along the plane 11—11 of FIG. 10 with portions shown in cross-section, other portions broken away and yet other portions shown in phantom.

FIG. 12 is a cross-sectional view of the spring return mechanism taken along the line 12—12 of FIG. 11;

FIG. 20 is a front elevation view of the actuator contactor disk;

FIG. 21 is a side elevation view of the contactor disk taken along the plane 21—21 of FIG. 20;

FIG. 22 is an electrical schematic diagram of the terminating means of the electric control means, and;

FIG. 23 is a top plan view of the terminating means circuit board which embodies the circuit of FIG. 22.

DETAILED DESCRIPTION OF THE PREFERRED EMBODIMENTS

Figure 1:
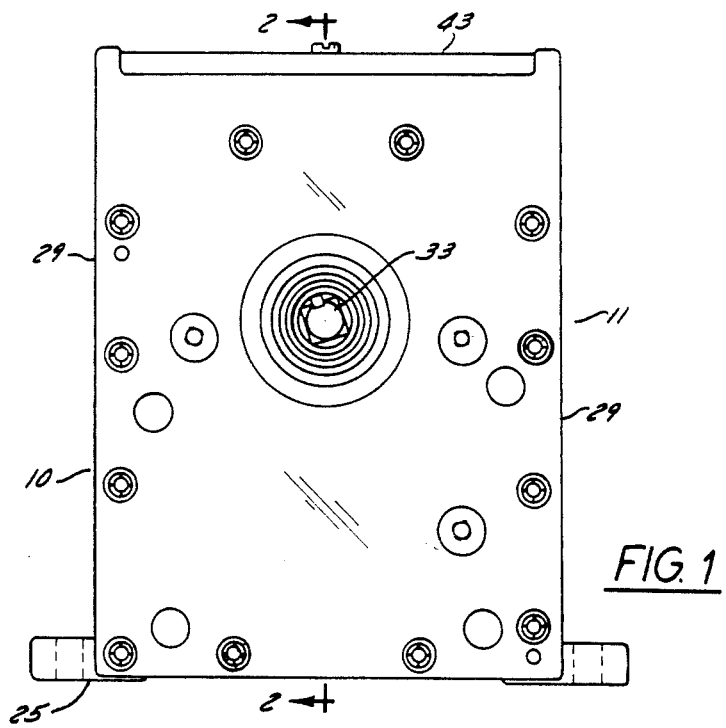
FIG. 1 is a front elevation view of the actuator of the present invention.
Figure 2:
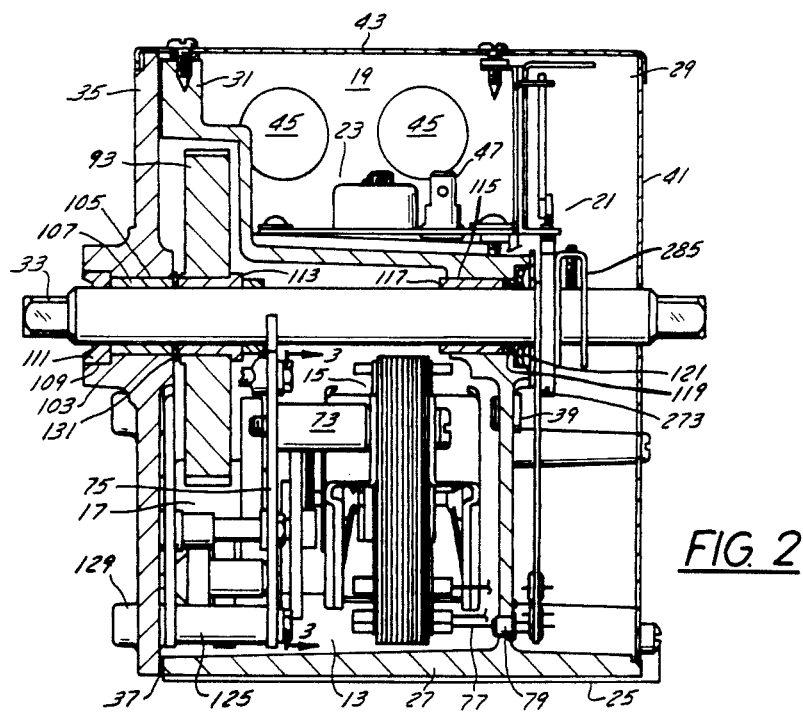
FIG. 2 is a side elevation view of the actuator of FIG. 1 taken substantially along the plane 2—2 thereof with portions shown in cross-section and other portions shown in full representation.

Referring to FIGS. 1 and 2 and particularly to FIG. 2, the actuator 10 is shown to include a partitioned enclosure 11 having a first compartment 13 for receiving the electric drive motor 15 and power transmission 17 and a second compartment 19 for receiving the electric controller 21 and termination board 23 components. The enclosure 11 includes a housing 25 having a base member 27, a pair of vertically disposed generally parallel side members 29 arranged in spaced relationship one to the other and a partition 31 for supporting the output shaft 33 and for defining a barrier between the first compartment 13 and the second compartment 19. While the base member 27, the side members 29 and the partition 31 may be formed as separate pieces for assembly, it is preferred that the housing 25 be formed as an integral unit as, for example, by die casting. The power transmission 17 includes a generally planar face member 35 adapted to abut the base member 27, the side members 29 and the partition 31 to define the first compartment 13. An oil seal 37 is disposed between the face member 35 and the base member 27, side members 29 and partition 31 for the retention of lubricating oil which may be introduced into the first compartment 13 through a fill hole sealable by a plug 39. A generally planar end panel 41 and top panel 43 cooperate with the partition 31, the face member 35 and the side members 29 for defining the second compartment 19 used for receiving the electric controller 21 components. An optional control transformer (not shown) may be incorporated upon the top panel 43 to accommodate line voltages other than those for which the motor 15 is constructed. A termination board 23 is received atop the partition 31 for the connection of field wiring brought into the enclosure 11 through apertures 45 within a side member 29 and such connection may be directly to the terminals 47 or through the control transformer.

Figure 3:
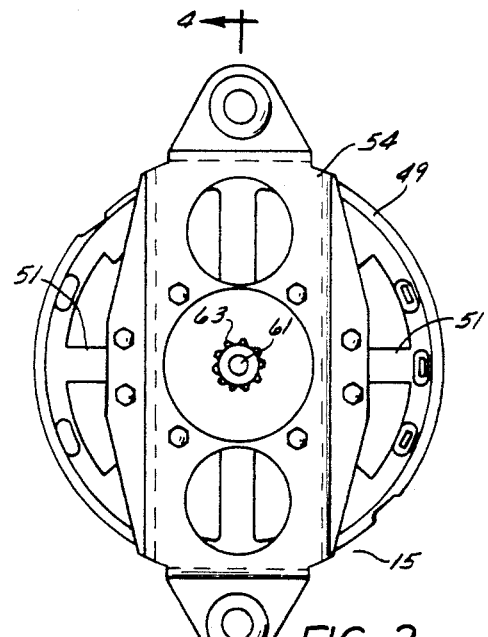
FIG. 3 is a front view of a first embodiment of the actuator drive motor taken along the plane 3—3 of FIG. 2.
Figure 4:
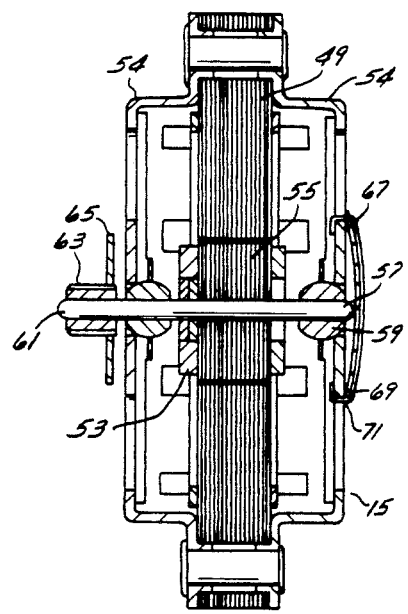
FIG. 4 is a side elevation view of the motor of FIG. 3 taken along plane 4—4 thereof.

A first embodiment of the electric drive motor 15, useful in actuators incorporating a spring return feature, is shown in FIGS. 2, 3 and 4 to include a laminated stator 49 having multiple poles 51, a rotor assembly 53 and a pair of end brackets 54 for supporting the stator 49 and rotor assembly 53 in an operative relationship. The rotor assembly 53 includes a rotor 55 disposed upon a shaft 57 supported for rotation by a pair of generally spherical, self-aligning bearings 59, preferably of bronze. At its first, output end 61, the shaft 57 has a first pinion gear 63 affixed thereto for drivingly coupling the motor 15 with the power transmission means 17. The pinion gear 63 has a face disc 65 attached thereto at its first end 61, the disc 65 being utilized for braking as described in greater detail below. A bearing strap 67 is disposed adjacent the second end of the shaft 57 and is retained in contact with the shaft end by a clip 69 configured to engage apertures 71 in the adjacent bracket 54. The bearing strap 67 may be formed of any suitable bearing material, as, for example, of nylon. In order to provide an acceptably long operating life of the bearing strap 67 and of the brake spring, described in detail below, it is preferred that both ends of the motor shaft 57 be hemispherically shaped and highly polished. The motor 15 is supported within the first compartment 13 upon spacers 73 or standoff studs (not shown) and is affixed to the power transmission second support plate 75 with suitable fasteners as, for example, by screws. For convenience in connecting the motor 15 to the electric control means 21, the motor leads 77 may be brought out through the partition 31 using insulated feedthrough studs 79.

Figure 5:
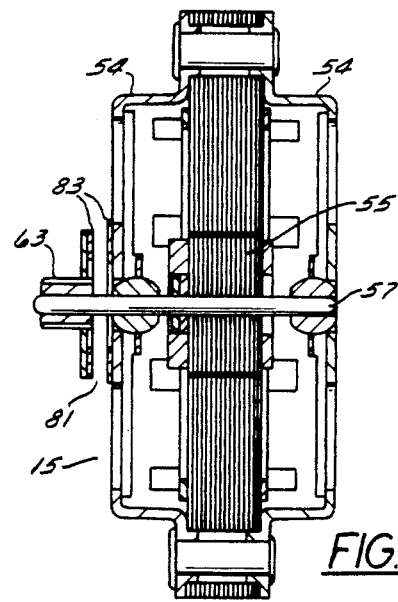
FIG. 5 is a side elevation view of a second embodiment of the motor and generally corresponding to the plane of view of FIG. 4.
Figure 7:
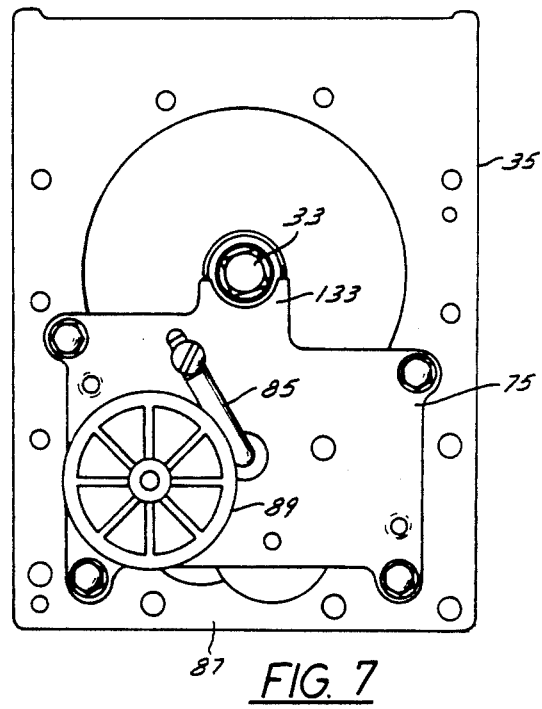
FIG. 7 is an end elevation view of the power transmission means taken along the plane 7—7 of FIG. 6 and further depicting a brake spring.

Referring next to FIGS. 2, 5 and 7, there is shown a second embodiment of the drive motor 15 useful in an actuator 10 from which the spring return feature is omitted and which is intended to retain the actuator output shaft 33 at an angular position upon motor de-engerization. In the latter instance, it is preferred that a retarder brake 81 be arranged therewithin for retaining the actuator output shaft 33 at its last-commanded angular position during quiescent conditions when the motor 15 is de-energized. Accordingly, the motor 15 incorporates a pair of opposingly arranged braking surfaces 83, one each disposed upon the inward surface of the face disc 65 and upon a portion of the outward surface of the adjacent bracket 54. By the omission of the strap 67 and clip 69 of FIG. 4, the motor shaft 57 is permitted to move longitudinally in a first, brake-engaging direction under the urging of a leaf type brake spring 85 and during those periods when the motor 15 is de-energized. Movement of the shaft 57 and rotor 55 in this manner will result in a slight displacement of the rotor 55 to a position somewhat laterally off center with respect to the stator 49 and its magnetic field. Upon motor energization, the rotor 55 will seek the center position of maximum field strength, resulting in slight movement of the rotor 55 and shaft 57 to overcome the urging of the brake spring 85 and disengage the braking surfaces 83.

In order to provide a rotary actuator 10 capable of exhibiting any one of a plurality of output torques and yet provide a construction having a manufactured cost consistent with each, it is perferred that the drive motor 15 be of the single phase, permanent split capacitor type whereby any one of a plurality of output torques may be achieved by appropriate selection of the stator winding wire size and number of turns and by the selection of the appropriate phase shifting capacitor. The windings are electrically insulated from the poles by a dielectric material disposed therebetween such as by plastic sleeves or the like (not shown). In the preferred embodiments, the drive motor 15 with spring return constructions omitted may have a first configuration for providing a preferred rated output shaft torque of 35 pound-inches within a preferred torque range of 25-55 pound-inches; a second configuration for providing a preferred rated output shaft torque of 75 pound-inches within a preferred torque range of 55-110 pound-inches and a third configuration for providing a preferred rated output shaft torque of 150 pound-inches within a preferred torque range of 110-160 pound inches. An 8-pole motor 15 is preferred for operation at 60 Hz, the motor 15 being internally connected to define two phases of four poles each.

Figure 6:
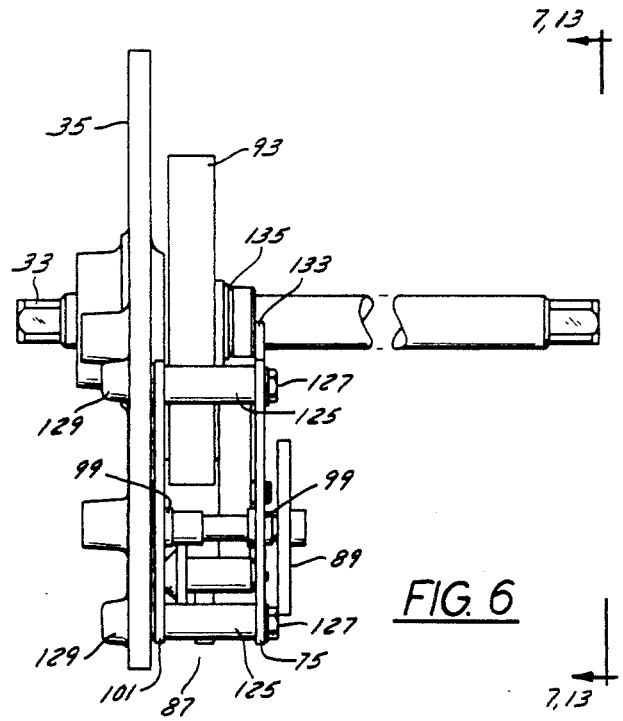
FIG. 6 is a side elevation view of the actuator power transmission means.
Figures 8, 9:
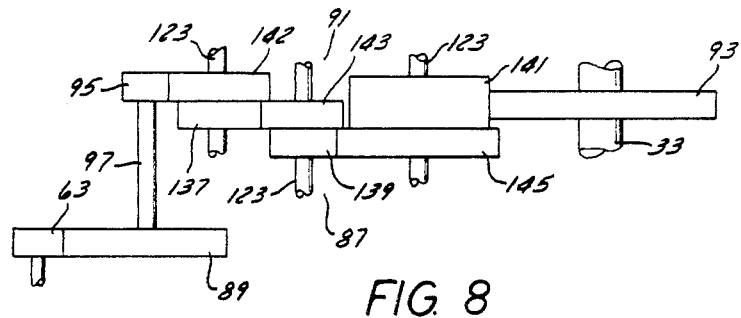
FIG. 8 is a mechanical schematic view of the drive elements of the power transmission means and further including the motor pinion gear.
FIG. 9 is a tabulation depicting preferred materials from which the drive elements of FIG. 8 may be formed.

Referring now to FIGS. 2, 6, 7 and 8, the power transmission means 17 is shown to include a face member 35 having a rotatable output shaft 33 protruding therethrough and a gear assembly 87 supported thereon for transmitting driving torque from the electric motor 15 to a valve, damper or other device coupled to the shaft 33 for positioning control. As best seen in FIGS. 6 and 8, the power transmission 17 includes a first bull gear 89 for driven engagement with the motor pinion gear 63, intermediate gear means 91 and an output bull gear 93 affixed to and concentric with the longitudinal centerline of the output shaft 33. The first bull gear 89 and its related, concentrically arranged first pinion gear 95 are affixed to a first spindle 97, the latter being rotatably supported by bronze bushings 99 disposed in apertures in the first plate 101 and second plate 75. As best seen in FIG. 2, the face member includes an enlarged shaft boss 103 having a first pocket 105 formed therein and sized to receive a suitable first bearing 107 with pressed fit. A second, enlarged pocket 109 is formed in the outer face of the boss 103 concentric with the first pocket 105 and the output shaft 33 and is sized to receive a lip-type oil seal 111 for the retention of lubricating fluid within the first compartment 13. When arranging the output bull gear 93 upon the shaft 33, it is preferable to interpose therebetween a bushing 113 having interior and exterior diameters selected to provide non-slip fits between the bushing 113, the shaft 33 and the gear 93. In similar fashion, the partition 31 includes a third pocket 115 formed therein and sized to receive a second bearing 117 with pressed fit, the first bearing 107 and the second bearing 117 thereby cooperating to rotatably support the output shaft 33. The shaft and motor bearings 59, 107, 117 may be of any suitable construction as, for example, sintered bronze, nylon or DELRIN, a trademarked product of E. I. Du Pont, preferably filled with a dry lubricant.

A sealing disk 119 and retaining washer 121 are disposed outwardly of the second bearing 117 in a suitable pocket formed in the partition 31 for providing lubricating oil retention. Those drive elements comprising the intermediate gear means 91 are arranged for rotatable, driving engagement one with the other and are rotatably disposed upon suitable hardened steel spindles 123 which are rigidly, nonrotatably supported between the first plate 101 and the second plate 75. The plates 75, 101 are maintained in a parallel, spaced-apart relationship by standoff tubes 125 with the gear assembly 87 being attached to the face member 35 by suitable fasteners 127 such as cap screws or bolts which extend through the standoff tubes 125 and are received within internally threaded bosses 129 formed in the face member 35. The output bull gear 93 and its associated first bearing 107 and output shaft 33 are restrained from significant longitudinal movement by an inwardly projecting shoulder 131 of the first bearing 107 on the one hand and by a restraining fork 133 on the other hand. Due to manufacturing tolerances, it may be desirable to place one or more shims 135 between the fork 133 and the bushing 113 in a known manner to provide a specified maximum end play. The fork 133 is formed in the second plate 75 and has an upwardly projecting dimension selected to overlap the face end of the shaft bushing 113 or a shim 135, as the case may be. The length of the shaft bushing 113 is preferably selected to be only slightly less than the distance between the inward shoulder 131 of the first bearing 107 and the opposing, inward face of the restraining fork 133. When constructed and arranged in this manner, the output bull gear 93 will be maintained in full driven engagement with the intermediate gear means 91 while yet providing sufficient space between the bearing 107 and the bushing 113 and between the bushing 113 and the fork 133 so as to permit free shaft rotation and also to permit lubricating fluid to flow therebetween.

While the number of gear reductions between the motor pinion gear 63 and the output bull gear 93 may be only one reduction or a plurality thereof, the power transmission means 17 of the preferred embodiment comprises ten driving elements, including the motor pinion gear 63 and the output bull gear 93, arranged to provide five gear reduction resulting in an overall ratio of about 3200 revolutions of the motor shaft 57 for each revolution of the output shaft 33.

A unique feature of the power transmission means 17 is that its drive elements are adapted to be formed of disparate materials which result in lowered manufactured cost and acceptable field life consistent with the wide variety of torques required to be transmitted thereby. Further, the spindles 97, 123 including the output shaft 33 used to support the drive elements are disposed upon rotational axes, the locations of which remain fixed irrespective of the material from which the drive elements are formed.

FIG. 9 comprises a table depicting the materials used to form the various drive elements for each of the three output torque ranges of the preferred embodiments. Pinion gears 63, 95, 137, 139 and 141 and bull gears 89, 142, 143, 145 and 93 of FIG. 8 correspond to those same elements in FIG. 9.

With respect to the drive elements formed of plastic, appropriate materials may include a DELRIN 500 acetal compound or of 6/6 nylon, glass and TEFLON filled as available from LNP Corporation under catalog number RFL4036. DELRIN and TEFLON are trademarks of E. I. Du Pont. Error tolerance for composite error and functional tooth thickness of all drive elements is to be determined by the composite method of gear inspection as described in Appendix A of the AGMA Gear Handbook, Volume 1, AGMA 390.03 of 1972. AGMA class 1 master gear with type 2 calibration is preferred.

Referring next to FIGS. 2, 10, 11 and 12, it may be desirable in certain applications to cause the actuator output shaft 33 to be returned by spring force to a predetermined reference position whenever the drive motor 15 is de-engerized. In that event, an elongated output shaft 33' may be substituted for that of standard length to permit the mounting of a spring return assembly 147 upon the auxiliary shaft end 149 opposite the output end. A preferred spring return assembly 147 is shown in FIGS. 11 and 12 to include a housing member 151 for confining a spring 153 having a first tang end 155 thereof in torque transmitting engagement with a hub 157 formed on the output shaft 33' adjacent the auxiliary end 149. A second tang end 159 engages a notch 161 formed in the housing member 151 for spring retention. While a variety of spring arrangements such as coiled wire springs, spring loaded levers and the like may be used for positioning the output shaft 33', a preferred spring return assembly 147 includes a spirally wound spring 153 formed of a flat ribbon, preferably metallic.

Referring particularly to FIG. 12, in order to assure positive spring return of the output shaft 33' to a reference position, it is preferred that the spring 153 be preloaded prior to attachment of the spring return assembly 147 upon the actuator 10. Accordingly, the hub 157 includes a plurality of cylindrically shaped stop stud pockets 163 formed to a depth in the first face 165 of the hub 157 in a circumferentially spaced apart relationship one to the other and having their longitudinal axes parallel to the rotational axis of the hub 157 and the output shaft 33'. A plurality of counterbores 167 are formed in the hub second face 169 to have their longitudinal centerlines coincident with the corresponding centerline of the related stop stud pocket 163. A longitudinal passage 171 is concentrically formed between each counterbore 167 and its related pocket 163 and is sized to receive a stud retaining screw 173 with slight clearance. When it is desired to preload the spring return assembly 147, the hub 157 is manually rotated in a spring preloading direction until a desired peload is obtained. An appropriate stop stud 175 is thereupon inserted within a stud pocket 163 in a manner to prevent spring unwinding and thereby retain the preload. An appropriate stud 175 will have a threaded hole in the bottom thereof for receiving the retaining screw 173 and will have a length selected such that when the stud 175 is bottomed in its pocket 163, its projecting shoulder is of a height sufficient to engage a tang 177 formed in the backplate of the housing member 151. Mounting feet 179 having elongate apertures 181 formed therein are provided for fastening the spring return assembly 147 to the actuator enclosure 11.

It is to be appreciated that the spring 153 may be configured from ribbons of varying thicknesses, widths, lengths or a combination thereof to provide varying positioning torques. In a first preferred spring return configuration, the spring preload would be selected such that when the spring return assembly 147 is combined to an actuator 10 having a motor 15 of the second configuration, the preferred available output shaft torque is 25 lb-in. Similarly, a second preferred spring return configuration would employ a preload to result in an output shaft torque of 50 lb-in. when combined with a motor 15 of the third configuration.

Figure 13:
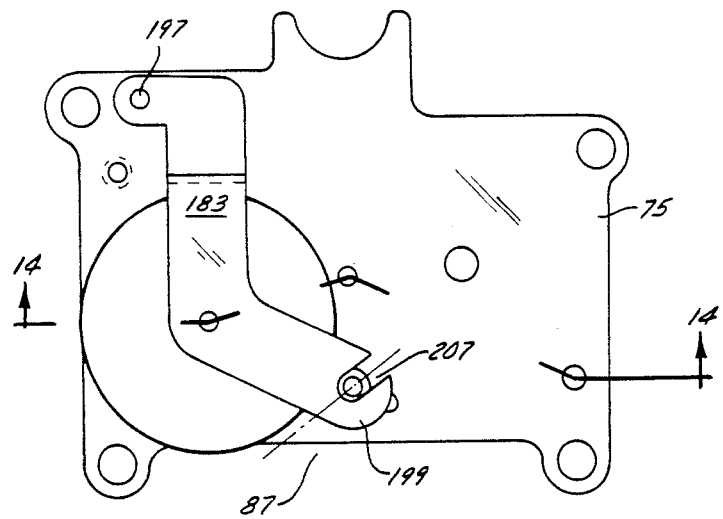
FIG. 13 is an end elevation view of a second embodiment of a gear assembly of the power transmission means taken along the plane 13—13 of FIG. 6.
Figure 14:
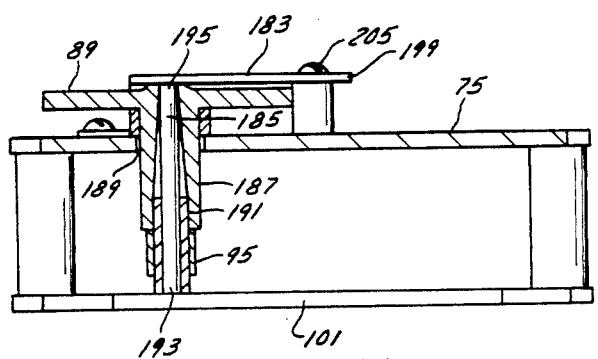
FIG. 14 is a bottom plan view of a portion of the gear assembly of FIG. 13 taken generally along the line 14—14 thereof and with portions shown in cross-section and other portions shown in full representation.
Figure 15:
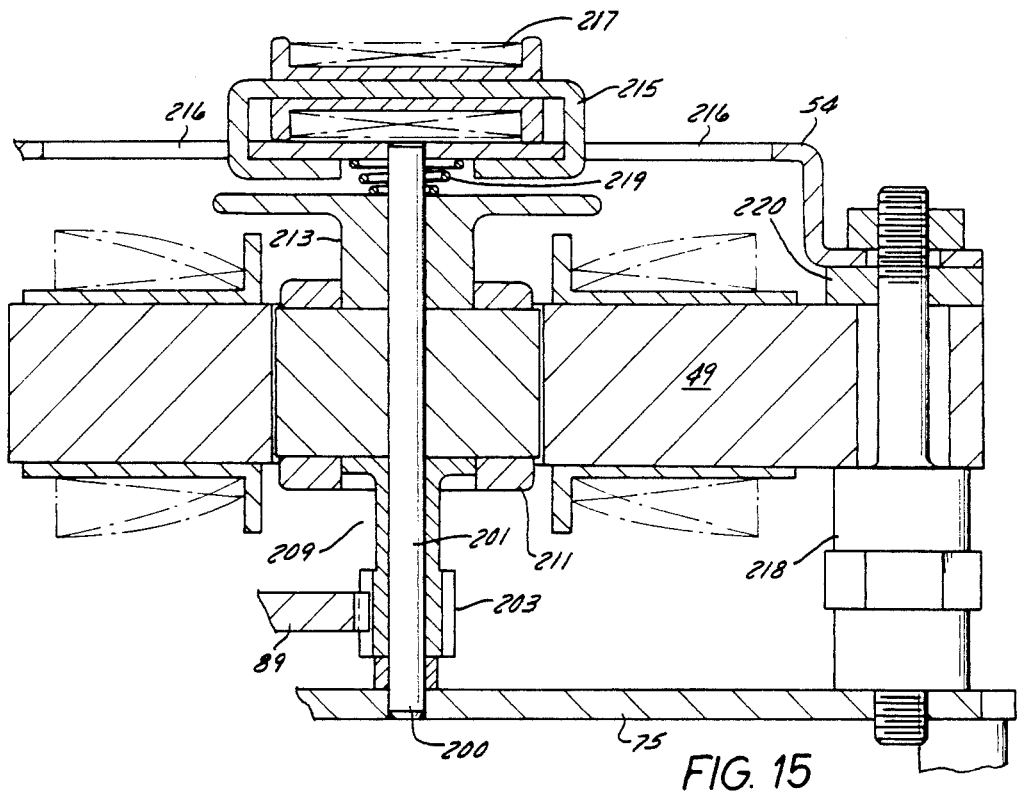
FIG. 15 is a side elevation view of a third embodiment of the actuator drive motor and generally corresponding to the plane of view of FIG. 4, with portions shown in cross section and other portions shown in full representation.

In certain applications requiring higher output torques and improved bearing life, it is desirable to eliminate the bronze bushings 99 used to rotatably support the first bull gear 89, the first pinion gear 95 and the spherical bronze bearings 59 used to support the rotor assembly 53. FIGS. 13 and 14 depict a second embodiment of the gear assembly 87 while FIG. 15 depicts a third embodiment of the motor 15. While the view of FIG. 14 is taken generally along the line 14—14 of FIG. 13, it should be understood that aspects of the adjustment bracket 183 described below are also included for clarity. The first bull gear 89 and first pinion gear 95 are shown in FIG. 14 to be rotatably supported upon a non-rotating axle 185, preferably formed of hardened steel. The shoulder 187 of the first bull gear 89 extends through an opening 189 in the second plate 75 with slight clearance therebetween to permit adjustment as described below. If a single material is used to form the gears 89, 95, the bull gear 89 and pinion gear 95 may be fabricated as a unitary structure. If disparate materials are required for the application, the pinion gear 95 will preferably include a neck member 191 sized to be received in a cavity within the first bull gear 89 with press fit. In the alternative, the mating portions of those gears 89, 95 may be formed to closely fitted, torque transmitting shapes such as a square or hexagon. A first end 193 of the axle 185 is press fitted to the first plate 101 while a second end 195 is supported by an aperture in an adjustment bracket 183, the latter having a first, pivot point 197 and a second, clamping end 199. An end 200 of the rotor shaft 201 is secured by press fit within a hole in the second plate 75 in a manner such that the motor pinion gear 203 is in driving engagement with the first bull gear 89. It is preferred that the pivot point 197, the center line of the axle 185 and the rotor shaft 201 center line define approximately a right angle. A stud and clamping screw 205 are disposed at the clamping end 199 of the bracket 183 and positioned to engage a slot 207 formed at the bracket end 199. Adjustment of the meshing position of the motor pinion gear 203 and the first bull gear 89 will thereby be facilitated and the clamping screw 205 thereafter tightened to maintain such adjustment. To effect smooth pivoting, it is preferred that the longitudinal slot axis and a line between the pivot point 197 and the clamping screw 205 also define a right angle.

As best seen in FIG. 15, the rotor assembly 209 includes a pinion gear portion 203, a rotor 211 and a brake member 213 assembled as a unitary structure and rotatably supported upon a stationary shaft 201, preferably formed of hardened steel. In those applications where solenoid-actuated braking is desired to be provided upon the motor 15, a generally C-shaped magnet clip 215 is received through slots 216 formed in the bracket 54 and has an electromagnetic coil 217 wound thereabout for brake actuation. If motor braking is desired, the coil 217 is actuated whereupon the rotor assembly 209 including the brake member 213 is magnetically drawn to the magnet clip 215 for frictional engagement therewith. Upon de-energization of the coil 217, a spirally wound biasing spring 219 urges the rotor assembly 209 to a position whereby the brake member 213 and the magnet clip 215 are in a spaced-apart relationship. A feature of this embodiment is that energization of the coil 217 and therefore actuator braking may be selectively controlled by external means.

In this embodiment, the motor stator 49 and bracket 54 are supported upon the second plate 75 by a pair of stand-off studs 218, only one of which is depicted. When clamping the stator 49 in position using the stud nut 220, accurate assembly and consequent free rotation of the rotor assembly 209 will be aided by the use of a gage block (not shown) temporarily fitted at the position of the rotor assembly 209. A suitable gage block will have a diameter only slightly in excess of the diameter of the rotor 211.

Figure 16:
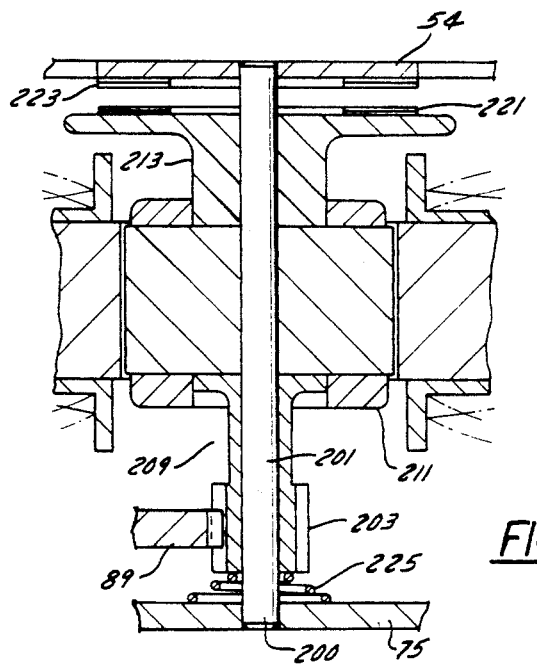
FIG. 16 is a side elevation view of a fourth embodiment of the actuator drive motor and generally corresponding to the plane of view of FIG. 4, with portions shown in cross section and other portions shown in full representation.

Referring next to FIG. 16, other applications may require that motor braking automatically occur whenever the motor 15 is de-energized. Accordingly, an annular friction disk 221 is affixed to the motor brake member 213 for frictional engagement with a second, similar disk 223 affixed to the bracket 54. A coiled spring 225 is disposed upon the shaft 201 intermediate the first pinion gear 203 and the second plate 75 for biasing the rotor assembly 209 to a braking position whenever the motor is de-energized.

Referring next to FIGS. 2, 17, 18, 19A and 19B, the electric control means 21 provides for rotation positioning control of the output shaft 33 in response to digital command signals. Positioning is by comparing a command signal representative of the desired shaft position with a feedback signal representative of the actual position of the shaft 33 and selectively generating an error signal based thereon. The electric control means 21 includes a first control circuit 227, shown in FIG. 17, having first means, preferably a potentiometer 229, for generating a signal representative of the actual angular position of the output shaft 33 and static switch means 231 for controllably energizing and de-energizing the drive motor 15. A trimming potentiometer 233 permits calibration to nullify the tolerances of the potentiometer 229 and the travel adjustment potentiometer 235 described in greater detail below. A phase-shifting capacitor 237 cooperates with the drive motor 15 for aiding in the determination of motor output torque. The electric control means 21 also includes a second, addressable control circuit 239 shown in FIGS. 19A and 19B, coupled to the first circuit 227 and responsive to digital command signals which may be received thereat from a separately mounted system controller (not shown). Such signals may comprise those representative of a desired position of the actuator output shaft 33 or may be of a type to cause a reset of the actuator 10 to a predetermined position. The second control circuit 239 includes power supply means 241, switch means 243 for address selection, a noise-attenuating bus interface means 245, a feedback section 247, an analog-to-digital converter section 249, a microcomputer section 251, a motor-energizing section 253 and optional setup means 255.

Figure 17:
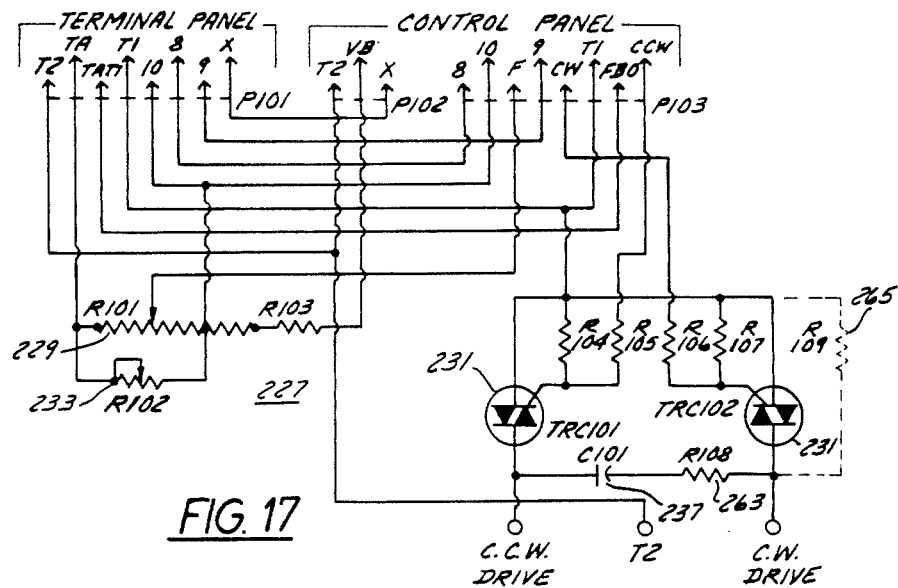
FIG. 17 is an electrical schematic diagram of the first control circuit of the actuator electric control means.
Figure 18:
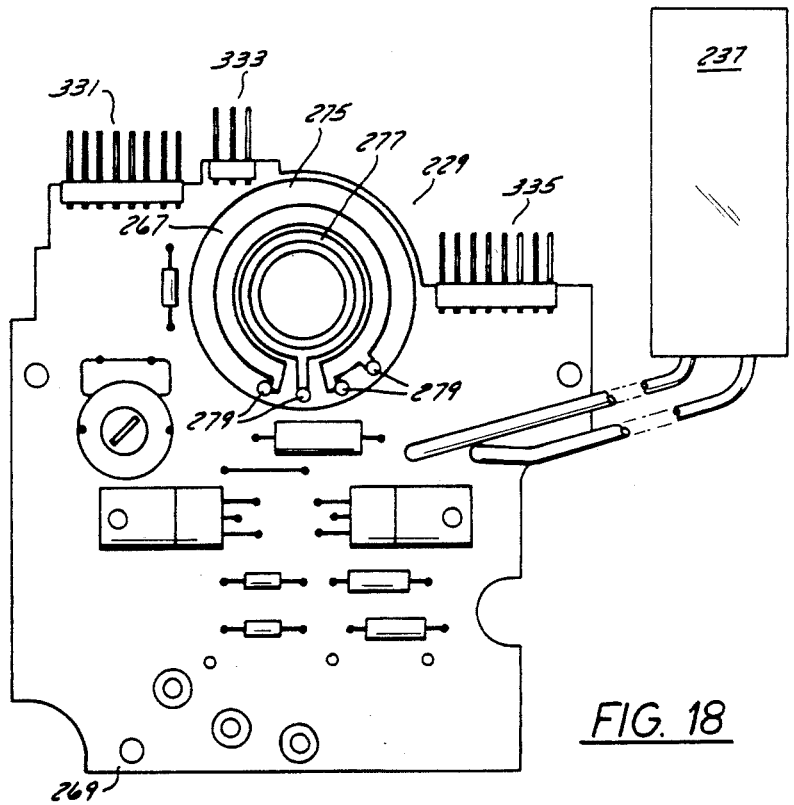
FIG. 18 is an elevation view of the first circuit board of the control means which embodies the circuit of FIG. 17.

More particularly and as best seen in FIG. 17, the first control circuit 227 includes an actuator position feedback potentiometer 229, a plurality of motor control switches 231 such as static triacs TRC101, 102 and a capacitor 237 coupled in series with its current limiting resistor 263. The potentiometer 229 provides a voltage signal representative of the actual output shaft position while the switches 231 are responsive to triggering signals received from the second control circuit 239 for selectively energizing and de-energizing the drive motor 15. Selective triggering of one of the two switches 231 will result in clockwise or counterclockwise rotation of the output shaft 33. In installations where it is preferable to incorporate the spring return assembly 147 (FIG. 10) upon the actuator 10, a biasing resistor 265 may be coupled in parallel with a switch 231 as shown for partially energizing the motor 15 to counterbalance the torque generated by the spring return assembly 147. Referring additionally to FIGS. 20 and 21, the potentiometer 229 is shown to include a pair of circular, generally concentric conductive plastic resistor ribbons 267 disposed upon a 0.005 inch thick KAPTON substrate which is attached to the circuit board 269 embodying the first control circuit 227 and an electrically conductive shorting clip 271 disposed upon a movable contactor disk 273, the latter being formed of an insulating material. The resistor ribbons 267 include an interrupted, generally circular outer resistance ring 275 and a concentric, inner resistance ring 277 with each of the rings 275, 277 having connecting posts 279 coupled to other components of the first control circuit 227 as shown in FIG. 17. The shorting clip 271 is formed of a conductive spring material and includes a plurality of spaced apart fingers 281 for contacting the resistance rings 275, 277 and electrically shorting thereacross at the points of contact. The contactor disk 273 includes an aperture 283 sized to snugly engage the output shaft 33 for coincident rotation therewith and is held in resistance ring contacting engagement by a wiper clamp 285 attached to the shaft 33 with a setscrew. To help assure that rotation of the disk 273 is coincident with that of the shaft 33, the disk 273 includes a truncated cone-shaped nipple 287 protruding therefrom to engage a drive aperture formed in the clamp 285. KAPTON is a trademark of E. I. Du Pont.

Figure 19A:
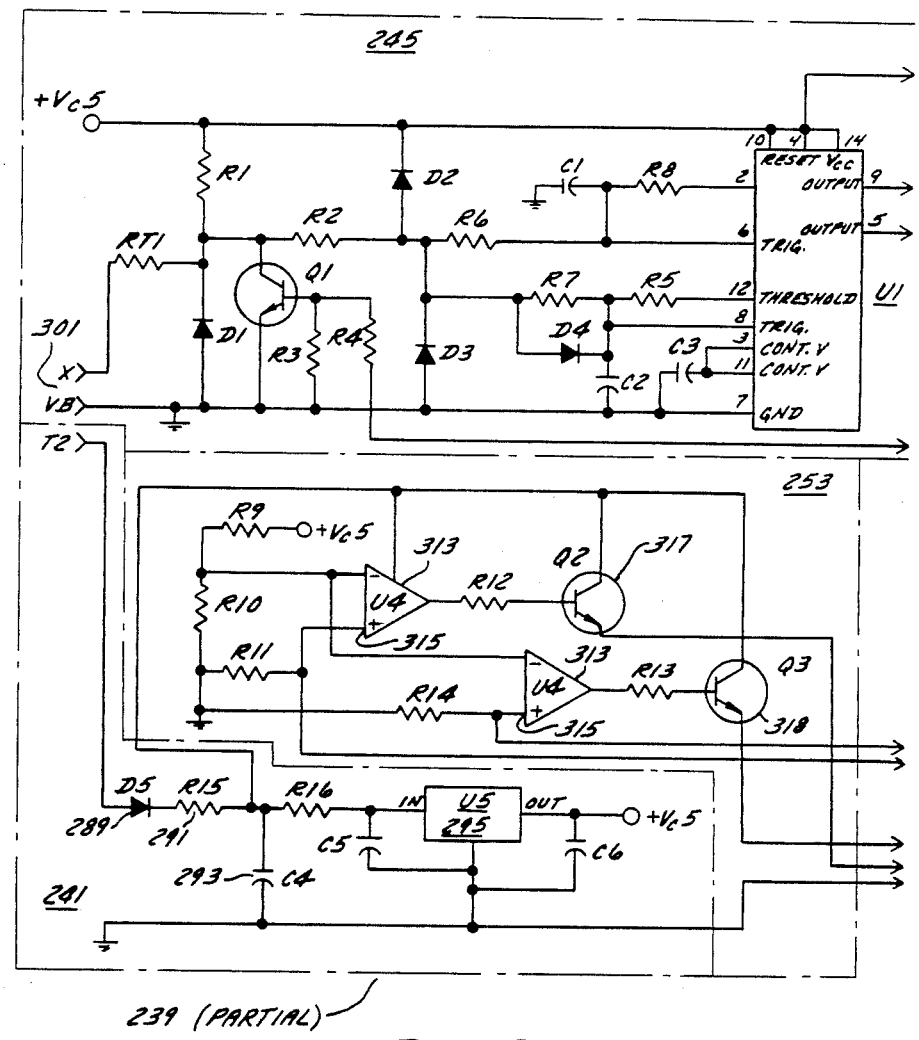
FIG. 19A is an electrical schematic diagram of a first portion of the second control circuit of the actuator electric control means.
Figure 19B:
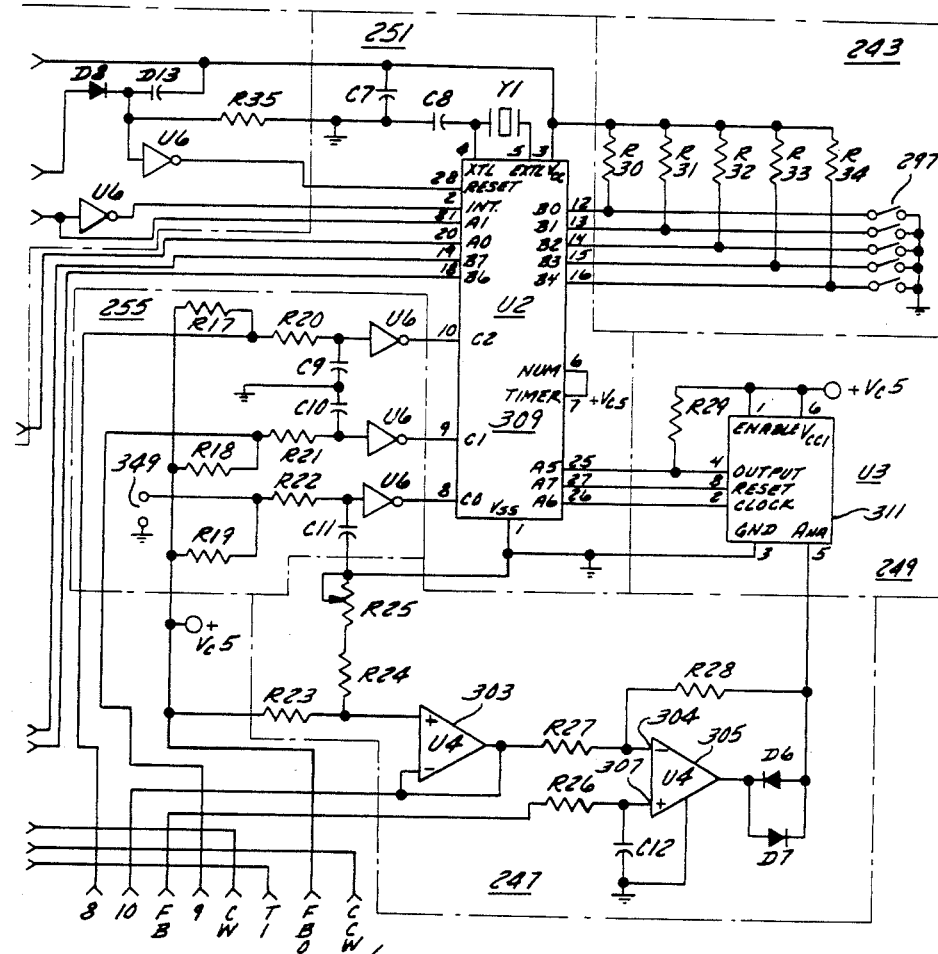
FIG. 19B is an electrical schematic diagram of a second portion of the second control circuit of the electric control means, the portions of FIGS. 19A and B being joined at the indicated match lines.

Referring to FIGS. 19A and 19B depicting the second control circuit 239, the power supply means 241 includes a diode 289, resistor 291 and capacitor 293 for generating a halfwave, unregulated DC voltage. In a preferred embodiment, the input voltage is 24 VAC and the unregulated output voltage is 12 VDC minimum. The unregulated voltage is coupled to the motor energizing section 253 and to a regulator 295 which generates a nominal 5 VDC for powering the balance of the second circuit 239.

The switch means 243 includes a plurality of two position, slide action switches 297, one side of each switch 297 being grounded and the other being coupled to one of a plurality of pull-up resistors 299. Closure of any switch 297 will permit selection of the microcomputer-stored bus address code to which the second circuit 239 will be responsive.

The resettable bus interface means 245 permits the transfer of signals, either in transmission or reception, between the bus terminals 301 and the microcomputer section 251. The interface means 245 incorporates a unique circuit for attenuating spurious electrical noise, thereby reducing the susceptibility of bus communications to interference. Further details of the interface means 245 are shown and described in United States patent application Ser. No. 06/469,930 entitled Noise-Neutralizing Digital Interface Circuit, filed on the same day and assigned to the same assignee as this application.

In order to permit the accurate positioning of the output shaft 33 in accordance with digital position command signals received at the second circuit 239 from the bus terminals 301, the circuit 239 also includes a feedback section 247 for generating an amplified analog error signal representative of the difference between the actual and the desired portions of the output shaft 33. Accordingly, the feedback section 247 includes a first amplifier 303 for generating a reference voltage and directing this voltage to the actuator feedback potentiometer 229. This reference voltage is also directed to a first input pin 304 of a second amplifier 305. The voltage emanating from the feedback potentiometer 229 and representative of the actual output shaft position is directed to a second input pin 307 of the amplifier 305, whereupon the voltages are compared, their difference amplified and directed to the analog-to-digital converter section 251.

The converter section 251 is reset about ten times per second whereupon clock pulses emanating from the microcomputer 309 are applied to pin 2 of the converter 311 until the converter output pin 4 is switched to a logic "0" which may occur at clock pulses numbering between 1 and 127. The number of clock pulses required to provide a logic "0" at output pin 4 will comprise the numerator of a fraction having 127 as its denominator, the result being representative of the actual output shaft position as a fraction of the full rotation span preselected by the travel adjustment potentiometer described below.

The motor energizing section 253 includes a pair of amplifiers 313, each having an input pin 315 coupled to an output pin of the microcomputer 309 as shown. The amplifiers 313 function as high input impedance switches and voltage level shifters for selectively switching either the transistor 317 or the transistor 318 to a conducting state whenever it is desired to rotate the output shaft 33. The resulting transistor emitter current is directed to the static switching means 231 for selective triggering thereof to cause rotation of the drive motor 15 in a clockwise or counterclockwise rotation.

While connection of incoming field wiring to the actuator 10 may be to terminal studs on the first control circuit 227 or the second control circuit 239, wiring will be facilitated by the incorporation of an optional terminating means 319 (FIGS. 2, 22 and 23) having suitable connectors 321 as, for example, upwardly extending spade lugs for wiring attachment. Additionally, the terminating means 319 preferably incorporates a travel adjustment potentiometer 323 for preselecting a second angular position of the output shaft 33. It is convenient to arbitrarily designate the first angular position as being at 0° and the potentiometer 323 permits the selection of a second angular position within a predetermined range of angular positions. The resulting difference between the first and second positions defines the magnitude of the arc segment through which the output shaft 33 may be turned as the command signal changes from zero to full value. In the preferred embodiment, the predetermined range of positions is between 65° and 270°. Selection of a second angular position of 100°, for example, will permit the shaft to rotate between 0° and 100° positions over the full range of the command signal.

The family of circuits comprising the first control circuit 227, the second control circuit 239 and the terminating means 319 may be constructed using individually wired components or, in the alternative, may each be assembled to single printed circuit boards. It is preferable, however, to arrange the circuits 227, 239, 319 so they may be conveniently fitted within the second compartment 19 in interfaced electrical connection according to the dictates of the application. Referring to FIGS. 10, 18, 19A, 19B and 23, the first control circuit 227 and the terminating means 319 of the preferred embodiment are each fabricated as discrete printed circuit boards 269, 327 respectively. The second control circuit 239, being substantially more complex, is fabricated as two printed circuit boards 329, 329a and the boards 269, 327, 329, 329a are configured such that the board 269 of the first control circuit 227 may be received in a first location, the boards 329, 329a of the second control circuit 239 in second and fourth locations respectively and the board 327 of the terminating means 319 in a third location, all as shown in FIG. 10. When constructed and arranged in this manner, connections between the boards 269, 327, 329, 329a may be readily accomplished using plug-in connectors. By way of illustrating the manner in which the boards 269, 327, 329, 329a of the control circuits 227, 239 and the terminating means 319 may be fabricated to be readily received within the enclosure 11, the first control circuit board 269 of FIG. 18 embodies the schematic diagram of that same circuit as shown in FIG. 17. The board 269 includes a first group 331 of upwardly extending, parallel, spaced-apart terminating studs for connection to the terminating means board 327 and a second group 333 and third group 335 of similarly arranged terminating studs for connection to the second control circuit board 329. The first terminating means board 327 includes a first group 337 of upwardly extending, generally parallel, spaced-apart terminating ferrules of generally tubular construction, each having an opening therethrough sized to slidably engage a correspondingly positioned stud of the first group 331 for electrical conduction therebetween. Similarly, that portion of the second control circuit board 329 received in the second location includes a second group 339 and a third group 341 of terminating ferrules sized and located to slidably engage correspondingly positioned studs of the second group 333 and the third group 335 for electrical conduction therebetween. Connection between the two boards 329, 329a embodying the second control circuit 239 is by a flexible multiconductor ribbon (not shown).

As best seen in FIG. 10, an annular insulating disk 343 is disposed between the board 269 and the shoulder surrounding the partition pocket 115 for the prevention of electrical short circuits at the inward side of the board 269 of the first control circuit 227. In order to securely support that portion of the second control circuit printed circuit board 329 disposed in the second location and to insulate its inward surface from accidental contact with adjacent metal parts, an L-shaped support bracket 345 is formed to engage the upper extremity of the board 329 for support while an insulating barrier 347 is interposed between the bracket 345 and the board 329 for electrically insulative protection of the latter.

In operation, the first circuit board 269, the boards 329, 329a, 327 embodying the second circuit and the terminating means respectively are assembled within the housing 25 as shown and described above. A preferred motor 15 may be operated at a preferred voltage of 24 VAC within a range of 20-30 VAC, the voltage being applied at terminals T1 and T2 with the former being common. Terminals 301 are connected to the bus for communications therewith while one of the switches 297 is closed for determining the address to which the actuator 10 will be responsive. A second shorting jumper or switch (not shown) is installed across the terminals 349 if a linear rather than S-shaped actuator response curve is desired. Temporary connection of terminal 8 to common will rotate the actuator output shaft 33 to its zero position for linkage hookup. Upon disconnection of terminal 8 from common, terminal 9 may be temporarily connected to common for opposite rotation of the output shaft 33 to permit setting of the travel potentiometer 323.

From the foregoing, it should be understood that the rotary actuator 10 shown and described herein may be configured by the use of a variety of plug-in printed circuit boards to be adapted to any one of a wide variety of HVAC applications and control strategies. Further, construction and arrangement of the actuator including its printed circuit boards in the manner shown and described will permit marketing merchants to stock basic models of the actuator 10 including spring return and non-spring return versions and readily adapt them to any one of a wide variety of applications using stocked electric controller components.

The following components have been found useful in the construction of the preferred embodiments. Resistance is in ohms, 5% tolerance, ¼w. unless otherwise specified; capacitance is in microfarads, 20% tolerance.

| FIG. 17 | | | |
|---|---|---|---|
| R101 | 10K and 1K, 10% | R109 | 62, 5 w |
| R102 | 5K, 30% | TRC101, 102 | T106 |
| R103 | 3.3K | C101 23, | 110VAC |
| R104, R107 | 1K | | |
| R105, R106 | 560, 0.5 w. | | |
| R108 | 5.6, 2 w, ww | | |
| FIGS. 19A and 19B | | | |
| R1, R5, R8, R26 | 100K | C1, C3 | 0.01 |
| R2, R6, R10, R17-R19, R27, R30-R34 | 10K | C2 | 0.02 |
| R3 | 20K | C4 | 1000, 50 V |
| R4 | 6.8K | C5-C7, C9-C13 | 0.1 |
| R7 | 1 M | C8 | 27 pf |
| R9 | 27K | D1, D5 | 1N5060 |
| R11, R14 | 47K | D2-D4, D6-D8 | 1N4148 |
| R12, R13 | | Y1 | 4.00 MHz |
| R15 15 | 5 w | Q1 | GES5822 |
| R16 25, | 2 w | Q2, Q3 | GES5824 |
| R20-R22 | 470K | U1 | UA556 |
| R23 | 22K | U2 | MC6805 |
| R24 | 4.7K | U3 | TL507 |
| R25 | 5K | U4 | LM324 |
| R28 | 18K | U5 | UA7805 |
| R29 | 4.7K | U6 | CD4069 |
| RT1 | 10 at 25° C., ±30% | | |

While only a few preferred embodiments have been shown and described herein, the invention is not to be limited thereby but only by the scope of the appended claims.

We claim:

1. A motor-driven rotary actuator including:
   an AC electric drive motor configured for providing one of a plurality of output torques, said motor being capable of providing substantially the same output torque for either direction of motor rotation;
   power transmission means having a predetermined unchangeable gearing ratio and including a rotatable output shaft, said transmission means being coupled to said drive motor and including drive elements formed of disparate materials selected for transmitting one of said output torques;
   electric control means coupled to said motor for providing rotation positioning control of said output shaft in response to addressably coded digital command signals and including means for generating a feedback signal representative of the actual angular position of said output shaft, means for selecting an address signal to which said control means will be responsive and means for generating an error signal representative of the difference between the actual position and a desired position of said output shaft;

said electric control means further including interface means for attenuating spurious electrical noise and converter means coacting with microcomputer means for providing a clocked pulse signal representative of the position of said output shaft.

2. The invention set forth in claim 1 wherein said actuator includes a housing and said electric control means is embodied within a plurality of printed circuit boards received within said housing, said circuit boards being disposed in said housing in a mounted attitude to be substantially normal one to the other.

3. The invention set forth in claim 2 wherein said output shaft is rotatable between a predetermined first angular position and a second angular position selectable within a predetermined range of angular positions and said electric control means further includes terminating means for the connection of wiring thereto, said terminating means including means for selecting said second angular position.

4. A motor driven rotary actuator for use in heating, ventilating and air conditioning systems, the actuator including:

a housing;

an AC electric drive motor disposed in said housing;

power transmission means disposed in said housing and coupled to said drive motor, said transmission means including drive elements formed of disparate materials;

digitially addressable electric control means disposed in said housing, said control means including a plurality of circuit boards arranged in plug-in connection one to the other, said circuit boards being disposed in said housing in a mounting attitude to be substantially normal one to the other;

said plurality of circuit boards including a first circuit board, a second circuit board divided to a first portion and a second portion and a terminating board, said first circuit board and said first portion of said second circuit board each being in plug-in connection one to the other, said first circuit board and said terminating board each being in plug-in connection one to the other.

5. The invention set forth in claim 4 wherein said first circuit board includes a first group of terminating studs for plug-in connection to said terminating board and further includes a second group and a third group of terminating studs for plug-in connection to said first portion of said second circuit board.

6. The invention set forth in claim 5 wherein said first portion of said second circuit board and said first terminating board each include terminating ferrules slidably engaging said terminating studs of said first circuit board.

* * * * *

UNITED STATES PATENT OFFICE
CERTIFICATE OF CORRECTION

PATENT NO. : 4,554,496  Page 1 of 2
DATED : November 19, 1985
INVENTOR(S) : George Rudich, Jr.; Charles F. Beeson; Gary L. Bartley; Terry A. Heckenbach It is certified that error appears in the above-identified patent and that said Letters Patent are hereby corrected as shown below:

Column 5, line 42 "de-engerization" should be --de-energization--

Column 5, lines 60 & 61 "movemement" should be --movement--

Column 5, line 67 "perferred" should be --preferred--

Column 7, line 34 "reduction" should be --reductions--

Column 8, line 37 "peload" should be --preload--

UNITED STATES PATENT OFFICE
CERTIFICATE OF CORRECTION

Page 2 of 2

PATENT NO. : 4,554,496
DATED : November 19, 1985
INVENTOR(S) : George Rudich, Jr.; Charles F. Beeson; Gary L. Bartley; Terry A. Heckenbach It is certified that error appears in the above-identified patent and that said Letters Patent are hereby corrected as shown below:

Column 11, line 47, the following insertion should be made between "interference." and "Further" as follows --The interface means 245 acts to provide a first output or digital state condition when the incoming signal wave form transcends through a first intermediate voltage in a first transition direction and a second digital state condition when that wave form transcends through a second intermediate voltage in a second transition direction. Spurious electrical signals of a type having a maximum amplitude less than the difference between the intermediate voltages is thereby neutralized.--

Column 11, line 49 after "469,930", insert --, U.S. Patent No. 4,504,959--

Column 11, line 59 "portions" should be --positions--

Column 16, line 3 "digitially" should be --digitally--

Signed and Sealed this

First Day of April 1986

[SEAL]

Attest:

DONALD J. QUIGG

Attesting Officer

Commissioner of Patents and Trademarks